United States Patent [19]

Fabian et al.

[11] 4,158,312
[45] Jun. 19, 1979

[54] METHOD AND APPARATUS FOR GYRO ERECTION

[75] Inventors: Gordon R. Fabian; Leo P. Kammerer; Lynn F. Maxedon, all of Cedar Rapids, Iowa

[73] Assignee: Rockwell International Corporation, El Segundo, Calif.

[21] Appl. No.: 801,501

[22] Filed: May 31, 1977

[51] Int. Cl.² .................. G01C 19/28; G01C 19/30; G01C 19/54
[52] U.S. Cl. .................. 74/5.43; 74/5.6 D; 74/5.6 E; 74/5.8
[58] Field of Search .......... 74/5 R, 5.5, 5.6 D, 74/5.6 E, 5.43, 5.47, 5.8

[56] References Cited

U.S. PATENT DOCUMENTS

| 3,505,883 | 4/1970 | Moulton | 74/5.6 D |
| 3,787,100 | 1/1974 | Habermann et al. | 74/5.6 E X |
| 3,918,310 | 11/1975 | Evans et al. | 74/5.6 D |

Primary Examiner—Samuel Scott
Assistant Examiner—Don E. Ferrell
Attorney, Agent, or Firm—Terry M. Blackwood; H. Fredrick Hamann; L. Lee Humphries

[57] ABSTRACT

A gyro system employing the pickoff synchros as erection sensors and as torquers to erect the gyro.

13 Claims, 1 Drawing Figure

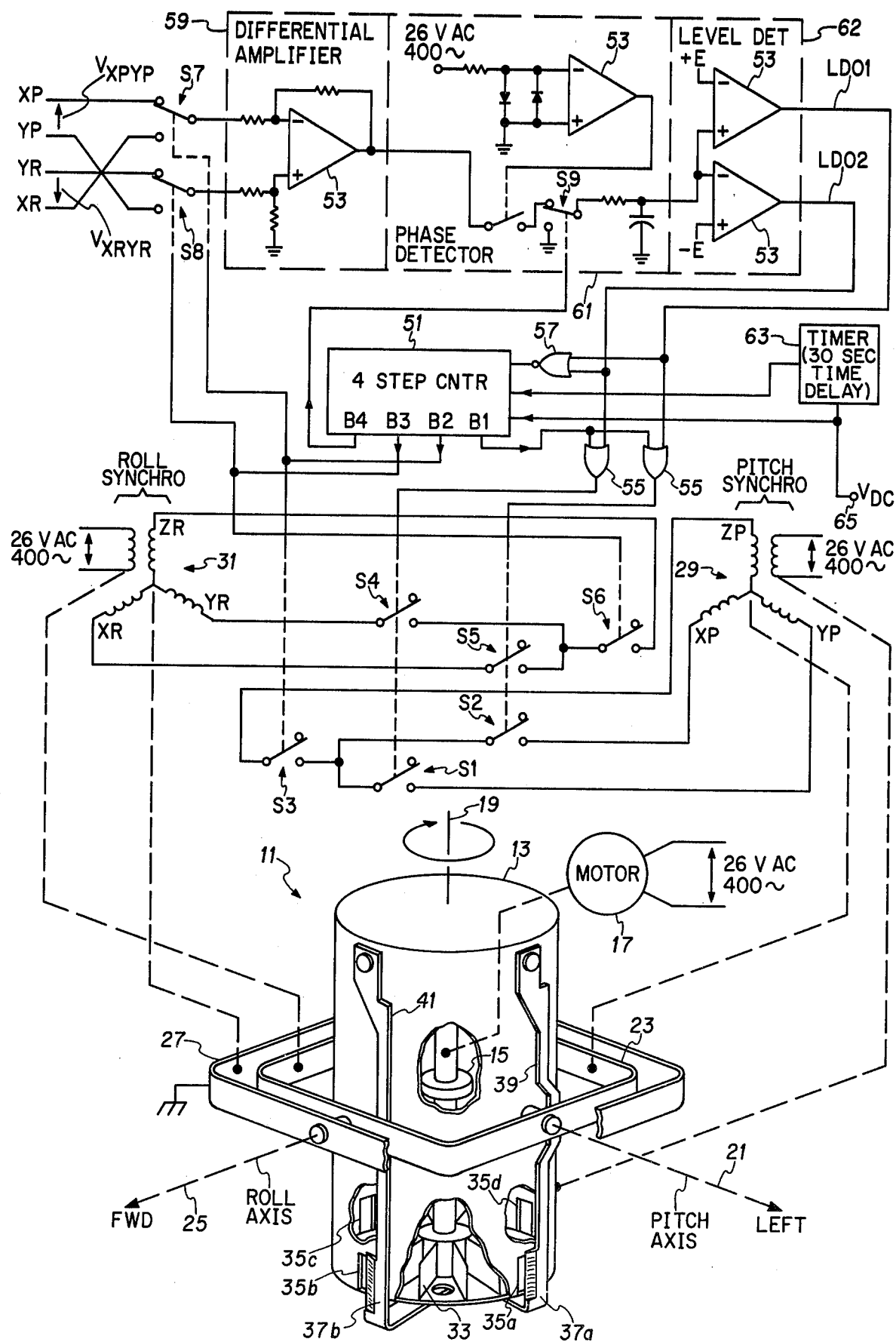

METHOD AND APPARATUS FOR GYRO ERECTION

This invention relates to gyros and more specifically to gyro erection.

A gyro generally encorporates some means for erecting the gyro to a reference position either initially upon equipment turn-on or during flight to restore the reference. For instance, several vertical gyros employ torquer motors and gravity sensitive switches mounted on the gimbals. The switches sense vertical and control power to the torquer motors to precess the gyro to a gravity referenced vertical position. A similar technique is often used in erecting directional gyros to a gravity referenced level orientation. Less expensive gyros have employed mechanical devices incorporating arrangements of shafts and cams which when engaged physically position the gyro gimbals to a case referenced orientation.

Further exemplary, air erected gyros employ air streams whose reaction forces, as controlled by gravity sensitive pendulous vanes, precess the gyro to its erect position. To combat the inherently low erection rate of such gyros, prior art systems have incorporated a technique in which prior to the commencement of rotor spin two appropriate stator leads of each of the pitch and roll pickoff synchros are temporarily shorted together. Having appropriate rotor excitation the synchros thus rotate toward their zero angle position and bring the gyro toward its erected position. However as the position approaches within about ± 10° from the zero angle, the synchro torque output produced by said shorting falls off appreciably and the rotation ceases. Consequently, since this technique is ineffective by itself to produce alignments with case vertical which are more accurate than about ± 10°, the slower air erection system is then brought into play to complete the erection.

In accordance with the present invention, rapid and accurate gyro erection is provided without additional erection devices by using the existing pickoff synchros as torquers.

These and other features, advantages, and objects of the invention will become more apparent upon reference to the following specification, claims and appended drawing in which the single FIGURE is a schematic depicting the presently preferred inventive embodiment as applied to an air erected gyro.

Turning now to the accompanying Figure, the gyro 11 comprises an air erected vertical gyro having inside inner gimbal 13 a gyro rotor 15 rotated by motor 17 around spin axis 19. Inner gimbal 13 is free to rotate about inner gimbal axis 21 relative to the outer gimbal 23 which in turn is free to rotate about the outer gimbal axis 25 relative to the case 27. A synchro control transmitter 29 is mounted along the inner gimbal axis between the inner and outer gimbals to provide to using equipment a signal indicative of the rotational orientation therebetween. In the preferred embodiment inner gimbal axis 21 is the pitch axis and synchro 29 is the pitch synchro. Another synchro control transmitter 31 is mounted along the outer gimbal axis between the outer gimbal and case to provide to using equipment a signal indicative of the rotational orientation therebetween. In the preferred embodiment outer gimbal axis 25 is the roll axis and synchro 31 is the roll synchro.

When the gyro is fully erected to the vertical position, the spin axis, inner gimbal axis, and outer gimbal axis are each orthogonal to the other two. After erection, spin axis 19 is maintained in a vertical position by the reaction forces of four air streams produced by fan 33 and emerging from inner gimbal orifices 35a, 35b, 35c, and 35d. Four valve gates 37a, 37b, 37c, and 37d, the latter two being on the back side and not shown, are borne in pairs by the orthogonally related, inner gimbal pivoted, U-shaped vanes or valve assemblies 39 and 41. Each gate is arranged to confront an associated orifice and is arranged in a complementing relationship to its paired gate. That is, as one vane or valve assembly rotates, one gate of the assembly confronts more of its associated air stream as the paired gate confronts less of its own associated air stream. The air streams are generally used not only to maintain a vertical spin axis orientation but also to initially erect the gyro. However, as mentioned above, the rate of unaided air erection is slow, and in accordance with the present application of the invention, initial erection of an air erected gyro is accomplished rapidly and accurately by using the existing synchros as torquers. Briefly, prior to substantial buildup of rotor angular momentum, the X and Y leads on both synchro stators are temporarily shorted together so as to erect the gyro to within about ± 10° of vertical. (Presumed of course is that during assembly both synchros were zeroed to a vertical reference condition so that both X to Y voltages are substantially zero at vertical.) After the rotor momentum has increased sufficiently, the roll synchro X to Y output signal is sampled to see if it falls within a predetermined range. If it does not fall within this range, the X lead (or the Y lead, depending on the phase of the sampled output signal) of the pitch synchro is shorted to the pitch synchro Z lead. This causes the pitch synchro to become a torquer which applies a torque to the inner gimbal. Application of this torque is transcribed into a motion 90° from its application and the outer or roll gimbal is precessed. This continues until the roll synchro X to Y voltage decreases to within the predetermined range of voltage. At that time the pitch synchro short is removed. The X to Y voltage of the pitch synchro is then used in similar manner for shorting X to Z or Y to Z on the roll synchro so as to produce torque for precessing the inner gimbal until the pitch synchro X to Y voltage falls within a predetermined range. When within this range the gyro has become caged substantially to case vertical and the roll synchro stator shorts are disallowed. Normal air erection then erects and keeps the gyro erected to the true vertical.

With more particular reference now to the circuitry of the accompanying Figure, counter 51 comprises a four step ring counter. That is, reading bits B4, B3, B2, and B1 from left to right, counter 51 counts 0001, 0010, 0100, 1000, and then back to 0001. Items 53 are operational amplifiers, items 55 are OR gates, and item 57 is a NOR gate. Each of synchros 29 and 31 is a conventional control transmitter having a three-winding wye-connected stator, each stator winding being space-phased 120° from the other two.

Synchro stator leads XR, YR, XP, and YP are connected to switches S7 and S8, and depending on the condition of these switches differential amplifier 59 delivers to phase detector 61 a 400 Hz signal proportional to either $V_{XPYP}$ or $V_{XRYR}$. Phase detector 61 outputs a dc voltage whose amplitude is proportional to the 400 Hz input peak, and whose polarity corresponds to the phase of the 400 Hz input. If this dc voltage is greater than +E, level detector 62 output LD01 is a logic 1, and level detector output LD02 is a logic 0. If this dc voltage is less than $-E$, LD01 is a logic 0 and LD02 is a logic 1. If the dc voltage is between $+E$ and $-E$ both the LD01 and LD02 outputs are logic 0's. To summarize, if $V_{XY}$ at the differential amplifier input is above 0 volts by more than a predetermined quantity K (i.e., if $V_{XY} > |K| = |K| \angle 0°$) then LD01 equals a logic 1 and LD02 equals a logic 0. If $V_{XY}$ is below 0 volts by more than K (i.e., if $V_{XY} < -|K| = |K| \angle 180°$) then LD01 equals a logic 0 and LD02 equals a logic 1. If $V_{XY}$ is within the range $-|K|$ to $+|K|$ then regardless of the phase of $V_{XY}$ both LD01 and LD02 are logic 0.

The time delay of timer 63 is selected to be 30 seconds for the preferred embodiment since the motor and rotor of the particular gyro employed require about 30 seconds after start up to gain substantial angular momentum; i.e., enough angular momentum to make the gyro look like a gyro.

In operation, initial application of system power brings point 65 up to $V_{DC}$, triggering counter 51 and causing bit B1 to go high and the other bits low. In response, the outputs of both OR gates 55 go high and switches S1, S2, S4, and S5 close. This puts an X to Y short on both the pitch and roll synchros and both synchros will thus align themselves and the gimbals to within about ± 10° of case vertical. Since this "coarse erection" requires less than 30 seconds in the preferred embodiment, motor 17 is also started (i.e., 26 VAC is applied thereto) at the time system power is initially applied. That is, these initial torque outputs caused by the X to Y shorts fall to a negligible amount by the time the gyro acts like a gyro.

Thirty seconds after application of system power, counter 51 is again triggered and counter bit B2 goes high, and the other three (B1, B3, and B4) go low. In response, switch S3 closes, the arm of switch S7 is pulled to the XR position, and $V_{XRYR}$ is impressed at the differential amplifier input. As explained above, either LD01 or LD02 will go high and one of switches S1 or S2 will be closed. (S4 or S5 will also close but same is inconsequential since S6 is open). Thus ZP via closed switch S3 and via the closed one of switches S1 or S2, will be shorted to one of XP or YP. This pitch synchro stator short causes the pitch synchro to output torque in a direction appropriate to precess the roll gimbal in a direction which reduces $V_{XRYR}$ and the spin axis deviation from vertical. When $V_{XRYR}$ decreases sufficiently and falls within the earlier mentioned predetermined range, both LD01 and LD02 become a logic 0 and the output of NOR gate 57 goes high triggering the counter such that B3 goes high and the others (B1, B2, and B4) go low. It should here be noted that in the preferred embodiment the value of E in the level detector 62 is chosen such that when both LD01 and LD02 are logic 0, the gimbal being erected is within about ± ½° of exact alignment with the case.

With B2 low the arm of switch S7 returns to the XP position and switch S3 opens. With B3 high the arm of switch S8 goes to the YP position and switch S6 closes. Operation is substantially similar to that described above except that $V_{XPYP}$ is impressed at the input of the differential amplifier 59 and that switches S4 and S5, as controlled by LD01 and LD02, now short $Z_R$ to either of $X_R$ or $Y_R$. Roll synchro 31 outputs torque of a direction appropriate to precess the pitch gimbal in a direction which reduces $V_{XPYP}$ and further reduces the spin axis deviation from vertical. When $V_{XPYP}$ decreases sufficiently toward 0, LD01 and LD02 both become 0, the output of NOR gate 57 goes high, and counter 51 is triggered such that B4 goes high and the others (B1, B2, and B3) go low. With B4 high the arm of switch S9 is pulled to ground and the level detector 62 is thus prevented from incrementing the counter any further.

It should be apparent that while one synchro X to Y voltage is being monitored and used to control the other synchro stator shorts from Z to X or Y, the monitored stator leads should not be shorted. Substantial simultaneity of synchro shorting (between Z and X or Y) would be course contaminate the monitored signal and produce erratic or undesirable results. Insubstantial simultaneity, such as that caused by leading/trailing edged dissimilarities, or contact bounce, etc., may be tolerated but the less such contamination of the monitored signal the better.

Alternatives to the preferred embodiment include reversing the order of gimbal erection; i.e., erecting the inner gimbal prior to erecting the outer gimbal. However, since the inner gimbal tends to be self-erecting, it is preferred to erect the inner gimbal last as this reduces the total time for initial caging.

Also, a series of timers could be used to control the erection sequence. More particularly, by determining for any particular gyro how much time each of the erection steps requires, an appropriate set of timers could supply the control signals presently supplied at counter outputs B1 through B4. Moreover the synchros could be alternately shorted instead of, as above described, sequentially shorted.

Also, the monitored synchro windings could comprise any pair because the variation of voltage therebetween as a function of rotation is either known or determinable. However, these variations are generally not symmetrical about a mid-position, nor do they range about zero volts, and thus this alternative is not preferred.

Thus while particular embodiments of the present invention have been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:

1. In a gyro system having a gyro, rotor, motor means for producing rotor spin about a spin axis, inner and outer gyro gimbals and gimbal mounting axes, and first and second synchros for sending to using apparatus the rotational orientation of said spin axis about, respectively, the inner and outer gimbal mounting axes, said first synchro having three stator windings with three stator leads a1, b1, and c1, and being aligned such that for full erection the voltage from lead a1 to lead b1, $V_{a1b1}$, is a predetermined voltage $P_1$, said second synchro having three stator windings with three stator leads a2, b2, and c2, and being aligned such that for full erection the voltage from lead a2 to lead b2, $V_{a2b2}$, is a predetermined voltage $P_2$, improved means for erecting the gyro when the gyro is within a predetermined angular range of its fully erect position and after the rotor has gained substantial angular momentum, said improved means comprising:

first means (i) responsive to $V_{a1b1}$ for shorting lead c2 to one of the leads a2 or b2 when $V_{a1b1}$ is above $P_1$ and outside a predetermined range $R_1$ of voltage around $P_1$, and for shorting lead c2 to the other one of leads a2 or b2 when $V_{a1b1}$ is below $P_1$ and outside $R_1$, said shorting of c2 to either a2 or b2 being disallowed when $V_{a1b1}$ is within said range $R_1$, and (ii) responsive to $V_{a2b2}$ for shorting lead c1 to one of the leads a1 or b1 when $V_{a2b2}$ is above $P_2$ and outside a predetermined range $R_2$ of voltage around $P_2$, and for shorting lead c1 to the other one of leads a1 or b1 when $V_{a2b2}$ is below $P_2$ and outside $R_2$, said shorting of c1 to either a1 or b1 being disallowed when $V_{a2b2}$ is within said range $R_2$, and second means having output coupled to said first means for preventing substantial simultaneity of first synchro stator shorts and second synchro stator shorts.

2. A gyro system as defined in claim 1 wherein said second means comprises means responsive to said first means.

3. A gyro system as defined in claim 2 wherein said second means comprises means for preventing stator shorting on the j th synchro while $V_{akbk}$ on the k th synchro is outside range $R_k$, j designating a predetermined one of the first or second synchros, and k designating the other synchro.

4. A gyro system as defined in claim 3 wherein said second means comprises means for preventing stator shorting on the first synchro while $V_{a2b2}$ is outside range $R_2$.

5. A gyro system as defined in claim 1 and further including means for causing the gyro to move from outside to within said predetermined angular range of its fully erect position, the further means comprising time delay means (i) for causing a shorting of lead a1 to lead b1 only for a predetermined time, and (ii) for causing a shorting of lead a2 to lead b2 only for a predetermined time, both the a1 to b1 short and the a2 to b2 short being removed prior to the shorts using c1 and c2.

6. A gyro system as defined in claim 5 wherein said a1 to b1 and a2 to b2 shorts are produced simultaneously.

7. A gyro system as defined in claim 1 wherein $P_1$ and $P_2$ are each approximately zero volts.

8. A gyro system as defined in claim 7 wherein $R_1$ and $R_2$ are substantially equal and each is substantially centered about zero volts.

9. A gyro system as defined in claim 1 wherein said gyro comprises an air erected gyro.

10. A gyro system as defined in claim 1 wherein said gyro comprises a vertical gyro.

11. In a gyro system having a gyro, rotor, motor means for producing rotor spin about a spin axis, inner and outer gyro gimbals and gimbal mounting axes, two synchros, each for sending to using apparatus the rotational orientation of said spin axis about a different one of the two gimbal mounting axes, one said synchro having three stator windings with three stator leads $\alpha 1$, $\beta 1$, and $\gamma 1$, and being aligned such that for full erection the voltage from lead $\alpha 1$ to lead $\beta 1$, $V_{\alpha 1\beta 1}$, is a predetermined voltage $\psi_1$, the other said synchro having three stator windings with three stator leads $\alpha 2$, $\beta 2$, and $\gamma 2$, and being aligned such that for full erection the voltage from lead $\alpha 2$ to lead $\beta 2$, $V_{\alpha 2\beta 2}$, is a predetermined voltage $\psi_2$, improved means for moving the gyro toward its fully erect position when the gyro is within a predetermined angular range of its fully erect position and after the rotor has gained substantial angular momentum, said improved means comprising means responsive to $V_{\alpha 1\beta 1}$ for shorting lead $\gamma 2$ to one of the leads $\alpha 2$ or $\beta 2$ when $V_{\alpha 1\beta 1}$ is above $\psi_1$ and outside a predetermined range $\rho_1$ of voltage around $\psi_1$, and for shorting lead $\gamma 2$ to the other one of leads $\alpha 2$ or $\beta 2$ when $V_{\alpha 1\beta 1}$ is below $\psi_1$ and outside $\rho_1$, said improved means disallowing said shorting of $\gamma 2$ to either $\alpha 2$ or $\beta 2$ when $V_{\alpha 1\beta 1}$ is within said range $\rho_1$.

12. In a gyro system having a gyro, gyro rotor, spin axis, first and second gyro gimbals and gimbal mounting axes, and first and second pickoff synchros for sending to using apparatus the rotational orientation of said spin axis about, respectively, the first and second gimbal mounting axes, the improvement comprising:
   (i) means for supplying from said first synchro a signal indicative of the rotational deviation about said first gimbal axis of the spin axis from a predetermined reference, and
   (ii) means responsive to said signal for causing said second synchro to output torque which precesses the spin axis in a direction so as to reduce said deviation.

13. A method of operating a gyro system having a gyro, rotor, motor means for producing rotor spin about a spin axis, first and second gyro gimbals and gimbal mounting axes, and first and second pickoff synchros for sending to using apparatus the rotational orientation of said spin axis about, respectively, the first and second gimbal mounting axes, said method comprising:
   (i) allowing the rotor to gain substantial angular momentum,
   (ii) obtaining from said first synchro a signal indicative of the rotational deviation about said first gimbal axis of the spin axis from a predetermined reference, and
   (iii) using said signal to cause said second synchro to output torque which precesses the gyro in a direction so as to reduce said deviation.

* * * * *

UNITED STATES PATENT AND TRADEMARK OFFICE
CERTIFICATE OF CORRECTION

PATENT NO. : 4,158,312

DATED : June 19, 1979

INVENTOR(S) : Gordon R. Fabian; Leo P. Kammerer; Lynn F. Maxedon

It is certified that error appears in the above-identified patent and that said Letters Patent are hereby corrected as shown below:

Column 4, line 8, after the word "monitored", insert the word --synchro--.

Column 4, line 11, delete the word "be" and substitute therefor --of--.

Column 6, line 18, delete "$\beta'$" and substitute therefor --$\beta2$--.

Signed and Sealed this

Ninth Day of October 1979

[SEAL]

Attest:

RUTH C. MASON
Attesting Officer

LUTRELLE F. PARKER
Acting Commissioner of Patents and Trademarks